(12) United States Patent
Tugenberg et al.

(10) Patent No.: US 6,996,547 B1
(45) Date of Patent: Feb. 7, 2006

(54) METHOD FOR PURCHASING ITEMS OVER A NON-SECURE COMMUNICATION CHANNEL

(75) Inventors: Steven R. Tugenberg, Scottsdale, AZ (US); Douglas A. Hardy, Scottsdale, AZ (US); Thomas E. Tkacik, Phoenix, AZ (US)

(73) Assignee: Motorola, Inc., Schaumburg, IL (US)

( * ) Notice: Subject to any disclaimer, the term of this patent is extended or adjusted under 35 U.S.C. 154(b) by 966 days.

(21) Appl. No.: 09/671,941

(22) Filed: Sep. 27, 2000

(51) Int. Cl.
*G06F 17/60* (2006.01)
(52) U.S. Cl. .................. 705/77; 705/50; 705/64; 705/52; 713/167; 355/52
(58) Field of Classification Search ............. 705/50, 705/77, 51, 64; 355/52
See application file for complete search history.

(56) References Cited

U.S. PATENT DOCUMENTS

| | | | | |
|---|---|---|---|---|
| 4,202,626 A | * | 5/1980 | Mayer et al. ............... 356/71 |
| 5,604,801 A | * | 2/1997 | Dolan et al. ............... 713/159 |
| 5,778,072 A | * | 7/1998 | Samar ......................... 380/30 |
| 5,877,482 A | * | 3/1999 | Reilly ....................... 235/380 |
| 6,016,476 A | * | 1/2000 | Maes et al. ................. 705/76 |
| 6,230,267 B1 | * | 5/2001 | Richards et al. .......... 713/172 |
| 2002/0018585 A1 | * | 2/2002 | Kim ........................... 382/125 |
| 2002/0049677 A1 | * | 4/2002 | Yamada et al. ............. 705/51 |
| 2002/0062281 A1 | * | 5/2002 | Singhal ....................... 705/39 |
| 2002/0073038 A1 | * | 6/2002 | Oshima et al. .............. 705/57 |
| 2002/0097878 A1 | * | 7/2002 | Ito et al. ..................... 380/277 |
| 2002/0120576 A1 | * | 8/2002 | Yamada et al. ............. 705/57 |
| 2002/0126844 A1 | * | 9/2002 | Rix et al. ................... 380/211 |
| 2002/0161722 A1 | * | 10/2002 | Matsushima et al. ....... 705/67 |

FOREIGN PATENT DOCUMENTS

EP 0138219 A2 * 4/1985

* cited by examiner

*Primary Examiner*—Firmin Backer
(74) *Attorney, Agent, or Firm*—Gregory J. Gorrie; Lawrence J. Chapa

(57) ABSTRACT

A method for purchasing items over a non-secure communication channel uses a secure communication device. The secure communication device includes a host processor, a secure memory that includes a laser-scribed encryption key, and a non-secure memory for storing encrypted data. A user's sensitive data is encrypted within the secure memory using the laser-scribed encryption key and stored as encrypted data in the non-secure memory. An encrypted credit card number and an encrypted secret key is retrieved from the non-secure memory, the encrypted credit card and secret key are decrypted with the laser-scribed encryption key, the credit card number is encrypted with a session key, and the encrypted credit card number is transferred over the network to a destination such as an internet vendor.

19 Claims, 2 Drawing Sheets

METHOD FOR PURCHASING ITEMS OVER A NON-SECURE COMMUNICATION CHANNEL

FIELD OF THE INVENTION

This invention relates in general to the field of secure processing systems and in particular to processing systems with secure memory. The present invention also relates to internet transactions.

BACKGROUND OF THE INVENTION

Security is becoming a critical feature in processor and communication system designs today. It is becoming more important to be able to store non-volatile sensitive information within a product and protect this information from disclosure and/or modification. It is preferable to store this sensitive information where no external access to this data is possible. Unfortunately, it is difficult to combine technologies to accomplish this. For example, flash memory, EEPROM and fast logic devices are not easily manufactured on the same die due to incompatible process requirements or high cost.

Many portable communication devices provide connectivity to networks such as the internet. This connectivity may permit a user to purchase items over the internet using their portable communication device, but because many of these devices are relatively small and have very limited man-Machine interfaces, it is difficult to enter credit card information or other authenticating information using these portable communication devices. In addition, the Internet providers desire to make the purchasing of products on-line as simple and as pleasurable as possible.

Thus, what is needed are a system and method where credit card and authentication information is pre-loaded Thus, what is needed are a system and method where credit card and authentication information is pre-loaded onto a portable communication device so that it may be easily available for on-line transactions. What is also needed are a method and system that securely stores user authentication information and other sensitive information so that it cannot be easily extracted from the portable communication device, copied to another device, or modified.

What is also needed are a processing system and secure memory device that stores sensitive information in a way that it is not easily accessible. What is also needed is a method for storing and using sensitive information within processing systems and communication devices. What is also needed is a method for communicating sensitive information over a non-secure channel such as the internet.

DETAILED DESCRIPTION OF THE DRAWINGS

The present invention provides, among other things, a secure processing system for use in various types of communication devices. The secure processing system includes a host processor and a secure memory which provides for the storage of sensitive data in encrypted form in a storage medium external to the secure processing system. When needed by the host processor, the encrypted data is decrypted with encryption logic circuitry within the secure memory and transferred to a zeroizable memory for use by the host processor. The secure memory uses a laser-scribed encryption key coupled to encryption logic circuitry within the secure memory for encrypting and decrypting sensitive information. The laser-scribed encryption key is desirably unique to each device. In accordance with the present invention, the laser-scribed encryption key is generated by laser-scribing a semiconductor die during fabrication. The present invention includes other methods of generating the laser-scribed encryption key including, for example, burning on-time programmable fuses on a die.

The laser-scribed encryption key provides a master key used to protect sensitive data that is stored in a user's product. For example, such sensitive user data may include a user's social security number, credit card number, social security service keys or an ID used for secure digital initiatives, such as digital rights management. Sensitive data may also include application source code such as game software. Preferably only certain applications within the system will need to access this sensitive information.

Figure 1:
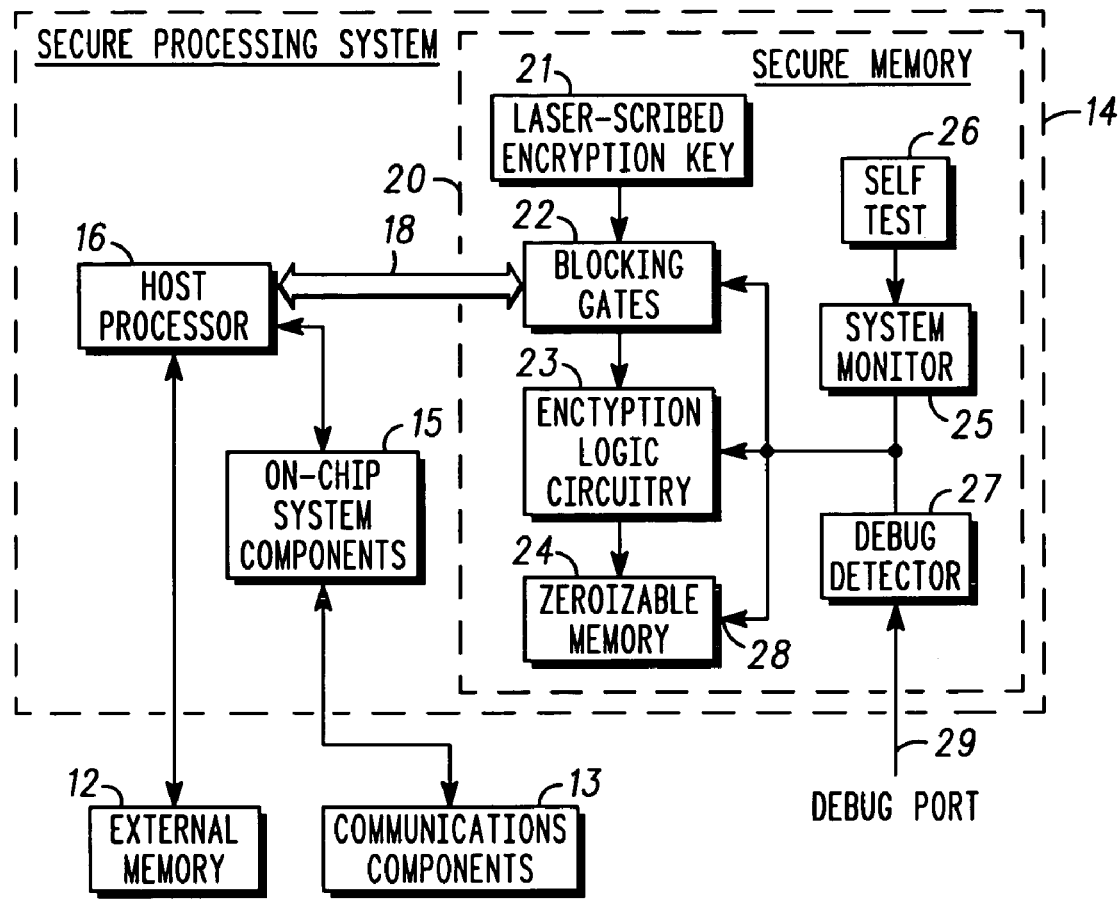
FIG. 1 is a simplified block diagram of a communication device with a secure processing system in accordance with the preferred embodiments of the present invention.

FIG. 1 is a simplified block diagram of a communication device with a secure processing system in accordance with the preferred embodiments of the present invention. Communication device 10 is comprised of a secure processing system 14 having an associated external memory 12 and other communication components 13. Device 10 may, for example, be a wireless communication device, such as a cellular or wireless phone, or a wireline communication device such as a computer, or a portion thereof. Communication components 13 provide for the functionality not described in detail in FIG. 1 for either a wireless or wireline communication device, and for either communicating voice, data or video. Secure processing system 14 is comprised of a host processor 16, secure memory 20, bus 18 coupling the host processor and the secure memory and on-chip system components 15. In accordance with the preferred embodiment of the present invention, host processor 16, on-chip system components 15 and secure memory 20 are fabricated on a single integrated circuit chip and is preferably separate from external memory 12 and other communication components 13. Host processor 16 may be one or more processing elements and is preferably the main controller for secure processing system 14. Preferably, processor 16 is a digital signal processor (DSP) or a micro-controller. On-chip system components 15 comprise other system processors, memory and other functional elements that are part of communication device 10 to allow for wireless or wireline communication of video, data and/or voice.

Secure memory 20 is coupled to the host processor 16 by data bus 18 and comprises a plurality of blocking gates 22 that are coupled to data bus 18. Secure memory 20 also includes laser-scribed encryption key 21 coupled to blocking gates 22. Secure memory also comprises encryption logic circuitry 23 and zeroizable memory 24. Encryption logic circuitry 23 preferably implements a symmetric encryption algorithm using laser-scribed encryption key 21. Zeroizable memory 24 is preferably a random access memory (RAM)

having zeroizing input 28. Zeroizable memory 24 may be coupled to either to encryption logic circuitry 23 or data bus 18. The contents of zeroizable memory 24 are erased, for example by causing the contents to be set to a fixed value such as zero or another predetermined value when a zeroized signal is received at zeroizing input 28. System monitor 25, for example, sends the zeroizing signal to zeroizable memory 24 upon the occurrence of any one of several predetermined conditions. Such conditions may include, for example, a detection of inappropriate access to the secure information in zeroizable memory 24 or the completion of an operation where the secure data in the zeroizable RAM is no longer needed. Furthermore, the zeroized signal preferably causes the encryption algorithm embedded within an encryption logic circuitry 23 to be reset and further causes blocking gates 22 to prevent access to laser-scribed encryption key 21 by encryption logic circuitry 23 and zeroizable memory 24.

In accordance with the preferred embodiment of the present invention, the blocking gates 22 are comprised of logic "AND" gates which, when activated by a blocking control signal, prevent access to (e.g., block) laser-scribed encryption key 21. In alternative embodiment, blocking gates 22 are comprised of logic "OR" gates. In one embodiment of the present invention the blocking control signal is coupled to the zeroized signal which blocks laser-scribed encryption key 21 and zero's zeroizable memory 24 when secure processing system 14 operates in a non-secure mode.

Laser-scribed encryption key 21 is a randomly generated sequence of "ones" and "zeros" suitable for an encryption key. The sequence is laser-scribed during fabrication of a semiconductor die to create a plurality of fixed "ones" and "zeros" which make up the ones and zeros of the encryption key. It is preferred that the laser-scribed encryption key be randomly generated and unique for each secure memory 20 so that the data encrypted by any particular secure memory can only be decrypted by that particular secure memory. In one preferred embodiment, laser-scribed encryption key need not be randomly generated as long as it's value is guaranteed unique. Typically, laser-scribed encryption key is 168 bits for the triple DES encryption algorithm and 128 bits for some other encryption algorithms, although other key lengths are equally suitable depending on the amount of security desired. In alternative embodiments of the present invention, laser-scribed encryption key 21 is comprised of a one-time programmable flash memory element, or alternatively non-volatile memory such as ROM, EEPROM, MRAM (Magnetoresistive RAM), battery backed RAM or DRAM, or other fast logic elements.

Secure memory 20 includes self-test element 26 for performing self test operations within secure memory 20 and processing system 14 to help ensure proper operation thereof and help prevent fault-based attempts to access secure memory 20. Secure memory 20 may also includes debug detector 27 with debug port 29. Debug detector, among other things, functions to disable secure memory 20 when for example software debug capability is being utilized.

Secure memory 20 includes system monitor 25 functions to help ensure the proper operation of secure memory 20. For example, improper attempts to access laser-scribed encryption key 21 or memory 24 are detected by the system monitor 25. Preferably, system monitor 25 monitors the sequence of events at power-up and when a power-up test is not completed successfully, system monitor 25 desirably prevents access to the secure memory components. In addition, system monitor 25 monitors activity on system debug port 29. Attempts to enable the debug capability of the system are detected by the system monitor 25. When system monitor 25 detects an unauthorized condition, blocking gates 22 are enabled to disable access to encryption logic circuitry 23 and zeroizable memory 24 and prevent the encryption logic circuitry 23 from accessing laser-scribed encryption key 21. In addition, system monitor 25 provides an assertion signal on zeroizing input 28 to zeroizable memory 24 to erase any information that has been stored therein.

In accordance with the preferred embodiment of the present invention, secure memory 20 is tested by self-test element 26 when secure processing system 14 is powered up. These tests, among other things, verify the proper operation of encryption logic circuitry 23, zeroizable memory 24, zeroizing input 28, and blocking gates 22. In addition, the ability of system monitor 25 to disable access to the secure memory is preferably also verified by self-test element 26 when secure processing system 14 is powered up. If any test fails, secure memory 20 is disabled.

In accordance with one embodiment of the present invention, communication device 10 contemplates having secret keys stored in non-secure external memory 12 in encrypted form, each secret key having been encrypted with laser-scribed encryption key 21 using secure processing system 14. When needed, communication device decrypts one of the secret keys with encryption logic circuitry 23 using laser-scribed encryption key 21, and stores the decrypted secret key in zeroizable memory 24. The decrypted secret key may be used by host processor 16 in any number of ways, including, for communications with other communication devices.

In one embodiment of the present invention, the decrypted secret key may be the user's private key which is part of a public/private key pair. In this embodiment for example, the user's private key may be used for authentication of digital signatures as well as decryption of data.

In another embodiment of the present invention, the secret key may be secret information used to generate a common session key with another communication device. The secret key may also be the common session key used to subsequently communicate secured information. In any of these embodiments of the present invention, secure data or secure voice or video may be communicated either over wireless or wireline networks. Communication components 13 and other on-chip system components 15 are suitably configured by those of ordinary skill in the art. Communication components 13, may include, for example, vocoders, transceivers, amplifiers, processors, etc.

It should be noted that, although various embodiments are disclosed herein, the present invention is equally suitable for the safeguarding and use of any sensitive information. Other embodiments are described below.

In another preferred embodiment, the present invention provides for a method of purchasing items over a non-secure communication link, such as the internet, for example using a secure communication device such as communication device 10 of FIG. 1.

In accordance with this embodiment of the present invention, a secure memory embedded in the Host processor is used to secure the user's sensitive information. The user of the portable communication device enter sensitive information such as a credit card numbers and other authentication information into the device. This can be done prior to any use of this information and may be performed using the device's keypad and display or it may involve downloading information from a computer, a network or wireless link.

Once the host processor is loaded with this sensitive information, the host processor uses the secure memory to encrypt the sensitive information using the laser-scribed encryption key. After encryption, the encrypted sensitive information is stored in a non-secure memory. The encrypted sensitive information does not need to be protected because this information can only be decrypted and used by the secure memory containing the laser-scribed encryption key that originally encrypted it.

The communication device may also be loaded with a digital certificate or public key used to establish a secure communication session with an internet vendor. Like the users of credit card information, the digital certificate may be encrypted by the secure memory using the laser-scribed encryption key and stored in non-secure memory.

In one embodiment of the present invention, an additional step for loading the communication device is to establish a personal identification number (PIN) for use in accessing control to the device. As with the credit card information, the PIN is loaded into the device, encrypted by the secure memory using the laser-scribed encryption key and stored in non-secure memory.

In an alternate embodiment of the present invention, an additional step for loading the communication device is to establish biometric information for use in accessing control to the device. As with the credit card information, the user's biometric information is loaded into the device, encrypted by the secure memory using the laser-scribed encryption key and stored in non-secure memory. In accordance with this alternative embodiment, the communication device preferably comprises components for receiving the user's biometric data. Examples of these biometric reception components include retinal scan components, fingerprint reading components, voice print identification components, and speaker identification and verification components.

In order to complete a transaction the user either enter the PIN, or provided biometric data to the biometric reception circuitry. This step, for example, helps protect the communication device from misuse in the event that the device is lost or stolen. Once the PIN is entered or the biometric data is received, the encrypted PIN or biometric data is retrieved from non-secure memory and decrypted by the secure memory using the laser-scribed encryption key. The decrypted PIN or biometric data is compared to the entered PIN or received biometric data and the transaction continues where the information matches.

The communication device then sends the encrypted certificate to the secure memory where it is decrypted using the laser-scribed encryption key. The host processor uses this certificate to establish a secure session with, for example, an internet vendor. Secure Socket Layer (SSL), for example, is a standard technique used in the internet community to establish such a session.

Once the secure session is established, the host processor sends the encrypted credit card and authentication information to the secure memory where it is decrypted using the laser-scribed encryption key. After decryption the host processor sends the decrypted sensitive information to a recipient such as an internet vendor through the secure session previously established.

One of the advantages of the present invention is that the sensitive information is never accessible outside of the host processor and the Secure Memory after it is originally loaded. In the preferred embodiment of the present invention, the secure memory and the host processor are on the same chip. In this case the sensitive information is never available outside of this chip, thus protecting the information from any external attempt to intercept it.

Another advantage of the present invention is that the user action during the purchase session is primarily only the entering of the PIN or providing the biometric information. The other steps for the secure transaction are automatic and occur without the knowledge or direction of the user.

Accordingly, user interaction is simplified during an internet purchase and the information required for on-line transactions is stored in a secure manner for multiple purchase sessions.

In accordance with other embodiments of the present invention, the present invention provides a method for transferring sensitive data over non-secure communication channels using the secure communication device of the present invention. The secure communication device includes a host processor, a secure memory that includes the laser-scribed encryption key, a non-secure memory for storing sensitive data in encrypted form; the sensitive data being previously encrypted with the laser-scribed encryption key.

Figure 2:
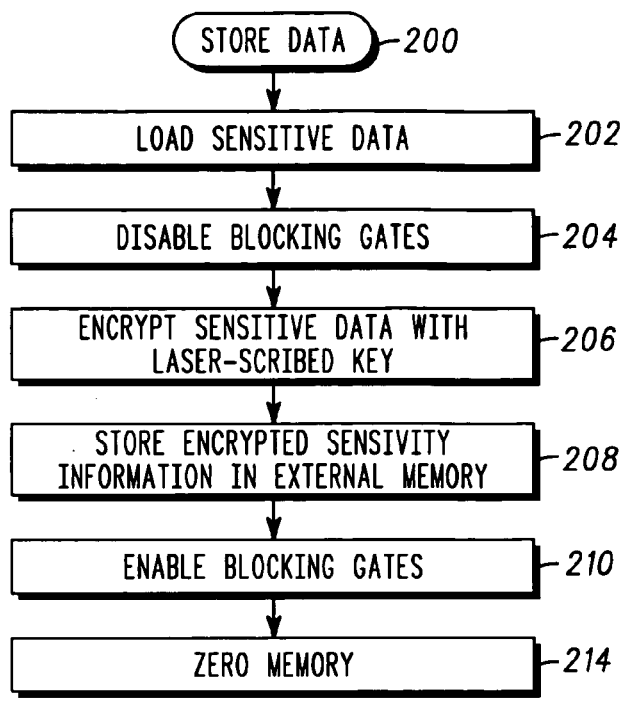
FIG. 2 is a simplified procedure for loading sensitive information in accordance with the preferred embodiments of the present invention.

FIG. 2 is a simplified procedure for loading sensitive information in accordance with the preferred embodiments of the present invention. Processing system 14 (FIG. 1), for example, is suitable for performing procedure 200, although other processing systems may be suitable.

Sensitive data or sensitive information is loaded into the processing system or device in step 202. This information may be loaded directly through a keypad or another external interface. The keypad may be an attached keypad and be a part of communication components 13 (FIG. 1). The information may also be loaded over a communication link, for example, via the communication components 13 (FIG. 1). In one embodiment, the information is loaded in a plain text form while another embodiment, the information is loaded in encrypted form and host processor 16 (FIG. 1), for example, may first decrypt the information prior to re-encrypting using secure memory 20 and storing it in external memory 12.

Once the sensitive information is loaded, the blocking gates, such as blocking gates 22 (FIG. 1) are disabled in step 204. Disabling the blocking gates permits the host processor to access the encryption logic circuitry and the zeroizable memory within the secure memory. Disabling the blocking gates also enables the encryption logic circuitry to access the laser-scribed encryption key 21 (FIG. 1). The host processor preferably never has direct access to the laser-scribed encryption key, even, for example, when the blocking gates are disabled.

In step 206, the host processor sends the sensitive information through the encryption logic. In this step, the sensitive information is encrypted with the laser-scribed encryption key by encryption logic circuitry and stored in a memory internal to the secure memory device, and preferably stored in a zeroizable RAM. The sensitive information is now encrypted with a key that is preferably only known by the secure memory and this key can not be readily extracted from the secure memory.

In step 208, the host processor reads the encrypted sensitive information from the zeroizable memory and stores this information in a memory that is preferably external to the secure memory such as external memory 12 (FIG. 1). Physical protection of the external memory may not be necessary because the encrypted version of the sensitive information is stored in the external memory while the key to decrypt the sensitive information (i.e., the laser scribed encryption key) is kept within the secure memory.

In step 210, the host processor enables the blocking gates to disable access to the encryption logic circuitry and the zeroizable memory and prevent the encryption logic from accessing the laser scribed encryption key. In step 214, a zeroize input signal, such as zeroizing input 28 (FIG. 1) is provided to the zeroizable memory to erase any information that was temporarily stored in the zeroizable memory.

Figure 3:
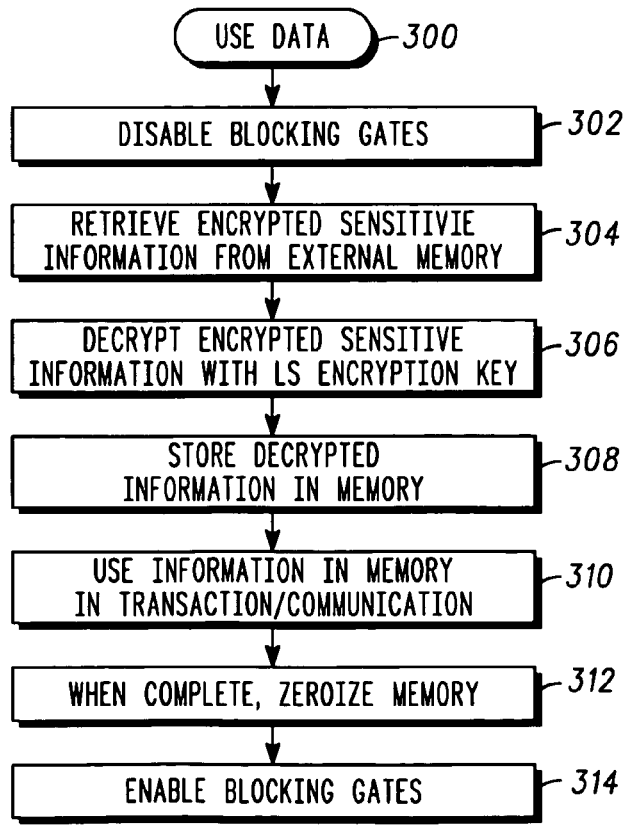
FIG. 3 is a simplified procedure for using sensitive information in accordance with the preferred embodiments of the present invention.

FIG. 3 is a simplified procedure for using sensitive information in accordance with the preferred embodiments of the present invention. This information, for example, may have been loaded in procedure 200 (FIG. 2). Processing system 14 (FIG. 1), for example, is suitable for performing procedure 300, although other processing systems may be suitable. Procedure 300 is executed when the host processor requires use the sensitive information that is stored in encrypted form.

In step 302, the blocking gates are disabled to allow the host processor to access the secure memory. Disabling the blocking gates permits the host processor to access the encryption logic circuitry and the zeroizable RAM within, for example, secure memory 20 (FIG. 1). It also enables the encryption logic circuitry access to the laser-scribed encryption key. The host processor desirably never has direct access to the laser-scribed encryption key, even when the blocking gates are disabled.

Once access to the secure memory is enabled, in step 304 the host processor reads the encrypted sensitive information, for example from external memory 12 (FIG. 1) and writes this information to the encryption logic circuitry. In step 306, the encryption logic circuitry decrypts the encrypted sensitive information using the laser-scribed encryption key. In step 308, the decrypted sensitive information is stored within the secure memory, preferably in zeroizable memory 24 (FIG. 1).

In step 310, the host processor uses the sensitive information for whatever purpose the information is needed for. The sensitive information remains in the zeroizable memory until the host processor causes the information to be erased. Also, an external event, may also cause the information to be erased. Erasing the information in the zeroizable memory is accomplished, for example, by the assertion of the zeroize input (e.g. input 28 FIG. 1) of the zeroizable memory. Examples of external events which cause erasure of the zeroizable memory include the systems detection of tampering or detection of an unauthorized condition, for example by system monitor 25 (FIG. 1) or debug detector 27 (FIG. 1). The host processor may access the sensitive information as often as needed while the information remains in zeroizable memory.

In step 312, the sensitive information that is temporarily stored in the zeroizable memory is erased. This is accomplished by the hose processor overwriting the information stored in the secure memory or by activating or asserting a zeroize input to the zeroizable memory. In accordance with this embodiment of the present invention, there is no need to re-encrypt the sensitive information or store this information back into external memory because preferably, the original encrypted sensitive information is not removed from external memory and is still contained within the external memory to be used next time the host processor requires access to the sensitive information.

When the host processor no longer desires access to the sensitive information in the zeroizable memory, in step 314 the host processor enables the blocking gates to disable access to the encryption logic circuitry and the zeroizable memory, and prevents the encryption logic circuitry from accessing the laser scribed encryption key.

Thus, a secure memory and secure processing system for use in various types of communication devices has been described which overcomes specific problems and accomplishes certain advantages relative to prior art methods and mechanisms. The improvements over known technology are significant.

The foregoing description of the specific embodiments will so fully reveal the general nature of the invention that others can, by applying current knowledge, readily modify and/or adapt for various applications such specific embodiments without departing from the generic concept, and therefore such adaptations and modifications should and are intended to be comprehended within the meaning and range of equivalents of the disclosed embodiments.

It is to be understood that the phraseology or terminology employed herein is for the purpose of description and not of limitation. Accordingly, the invention is intended to embrace all such alternatives, modifications, equivalents and variations as fall within the spirit and broad scope of the appended claims.

What is claimed is:

1. A method for purchasing items over a network using a secure communication device, the secure communication device including a host processor, a secure memory that includes a laser-scribed encryption key, and a non-secure memory for storing encrypted data, wherein sensitive data is encrypted within the secure memory using the laser-scribed encryption key and stored as encrypted data in the non-secure memory, the method comprising the steps of:
   retrieving an encrypted credit card number and an encrypted secret key from the non-secure memory;
   decrypting the encrypted credit card and secret key with the laser-scribed encryption key;
   encrypting the credit card number with a communication encryption key, the communication encryption key being related to the secret key; and
   transferring the credit card number, as encrypted with the communication encryption key, over the network to a destination.

2. The method as claimed in claim 1 wherein the encrypted data is decrypted within the secure memory using the laser-scribed encryption key and stored within the secure memory for use by the host processor.

3. The method as claimed in claim 1 further comprising the steps of:
   receiving a personal identification number (PIN) from a user;
   decrypting an encrypted PIN with the laser-scribed encryption key;
   wherein the step of transferring the encrypted credit card number step is performed when the decrypted PIN and the PIN received from the user compare.

4. The method as claimed in claim 1 further comprising the steps of:
   receiving biometric information from a user,
   decrypting stored biometric information for the user with the laser-scribed encryption key;
   wherein the step of transferring the encrypted credit card number step is performed when the decrypted biometric information compares with the biometric information received from the user.

5. The method as claimed in claim 1 wherein the communication encryption key is a common session key and wherein the method further comprises the step of generating the session key using the secret key and information provided by the destination.

6. The method as claimed in claim 1 wherein the host processor and secure memory are fabricated on an integrated circuit chip, and the encrypted data is stored in a non-volatile memory.

7. The method as claimed in claim 1 wherein the laser-scribed encryption key is generated by laser-scribing a semiconductor die during fabrication of the secure memory to create a plurality of fixed "ones" and "zeroes" which make up the laser-scribed encryption key.

8. The method as claimed in claim 1 wherein the laser-scribed encryption key is generated burning one-time programmable fuses on a semiconductor die during fabrication of the secure memory to create a plurality of fixed "ones" and "zeroes" which make up the laser-scribed encryption key.

9. The method as claimed in claim 1 wherein the secure memory includes blocking gates coupled between the laser-scribed encryption key and encryption logic circuitry, the blocking gates being comprised of logic gates and have a blocking control signal input preventing access to the laser-scribed encryption key by the encryption logic circuitry.

10. The method as claimed in claim 1 wherein the laser-scribed encryption key is unique for each secure memory of a plurality of secure memories of different processing systems.

11. The method as claimed in claim 1 wherein the laser-scribed encryption key is randomly generated for each secure memory of a plurality of secure memories of different processing systems.

12. A method for transferring sensitive data over a non-secure communication channel using a secure communication device, the secure communication device including a host processor, a secure memory that including a laser-scribed encryption key, and a non-secure memory for storing the sensitive data in encrypted form, wherein sensitive data is encrypted within the secure memory using the laser-scribed encryption key and stored as encrypted data in the non-secure memory, the method comprising the steps of:

retrieving the encrypted sensitive data and an encrypted secret key from the non-secure memory;

decrypting, in the secure memory, the encrypted sensitive data and the secret key with the laser-scribed encryption key;

encrypting the decrypted sensitive data with a session encryption key related to the secret key; and transferring the sensitive data encrypted with the session encryption key over the non-secure communication channel to a destination.

13. The method as claimed in claim 12 further comprising the steps of:

receiving biometric information from a user;

decrypting stored biometric information for the user with the laser-scribed encryption key;

wherein the step of transferring the encrypted sensitive data step is performed when the decrypted biometric information compares with the biometric information received from the user.

14. The method as claimed in claim 12 wherein the host processor and secure memory are fabricated on an integrated circuit chip, and the encrypted data is stored in a non-volatile memory.

15. The method as claimed in claim 12 wherein the laser-scribed encryption key is generated by laser-scribing a semiconductor die during fabrication of the secure memory to create a plurality of fixed "ones" and "zeroes" which make up the laser-scribed encryption key.

16. The method as claimed in claim 12 wherein the laser-scribed encryption key is generated by burning one-time programmable fuses on a semiconductor die during fabrication of the secure memory to create a plurality of fixed "ones" and "zeroes" which make up the laser-scribed encryption key.

17. The method as claimed in claim 12 wherein the secure memory includes blocking gates coupled between the laser-scribed encryption key and encryption logic circuitry, the blocking gates being comprised of logic gates and have a blocking control signal input preventing access to the laser-scribed encryption key by the encryption logic circuitry.

18. The method as claimed in claim 12 wherein the laser-scribed encryption key is randomly generated for each secure memory of a plurality of secure memories of different processing systems.

19. The method as claimed in claim 12 wherein the laser-scribed encryption key is unique for each secure memory of a plurality of secure memories of different processing systems.

* * * * *